Feb. 13, 1934.     R. R. NYDEGGER     1,947,166
STRANDS AND METHOD OF HANDLING THEM
Filed Jan. 13, 1931
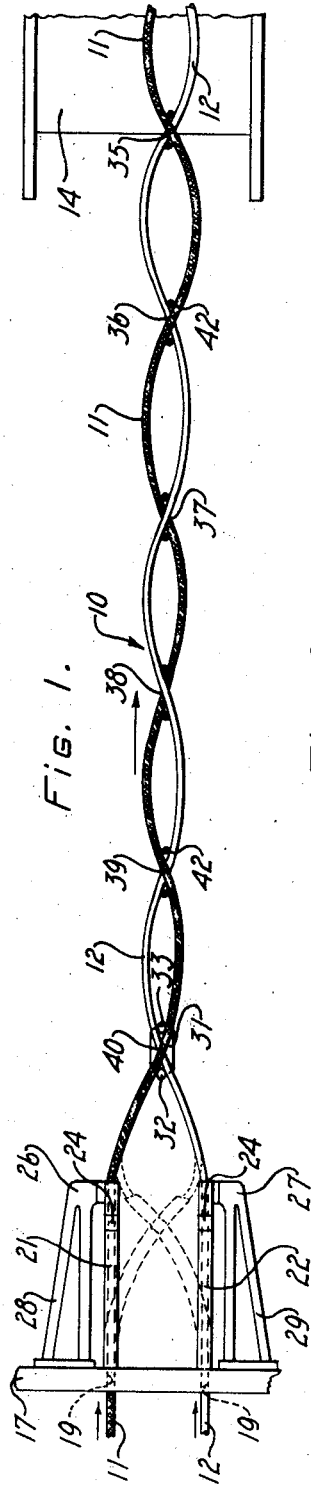
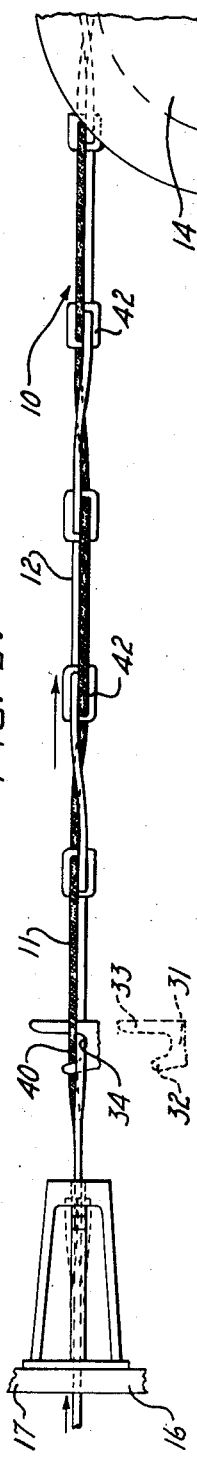
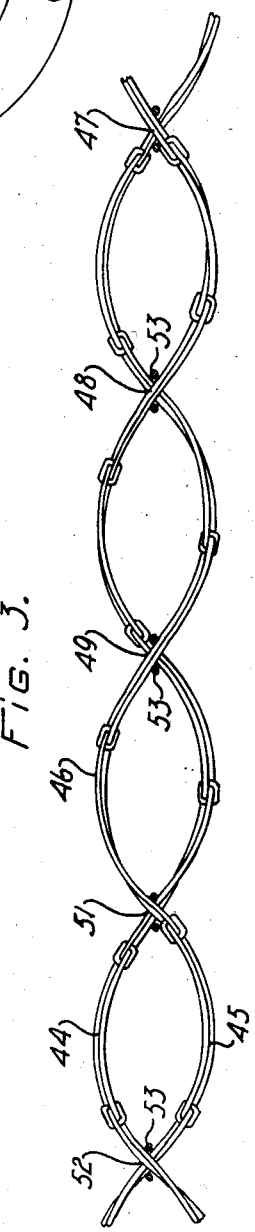
INVENTOR
R. R. NYDEGGER
BY
E. R. Nowlan
ATTORNEY Patented Feb. 13, 1934

1,947,166

UNITED STATES PATENT OFFICE 1,947,166

STRANDS AND METHOD OF HANDLING THEM

Roland R. Nydegger, Baltimore, Md., assignor to Western Electric Company, Incorporated, New York, N. Y., a corporation of New York Application January 13, 1931. Serial No. 508,471

18 Claims. (Cl. 173—81)

This invention relates to strands and a method of handling them and more particularly to composite electrical conductors for use in communicating intelligence electrically, and a method of producing them.

In the manufacture of conductor quads, i. e., a group of four conductors intended as a component unit of a multi-conductor cable, it has been a practice, in some instances, to twist two single conductor strands to form a pair and then twist two such pairs to form a quad. Heretofore, in some cases, each twisted pair or quad has been individually bound with a continuous cotton thread helically applied in order, among other reasons, to aid in causing the two wires of the pair or the two pairs of the quad, as the case may be, to be of the same length.

An object of the present invention is to provide a strand assembly of a new and improved construction and an economical, simple and efficient method of handling the strands.

The method may be practiced, and electrically and mechanically satisfactory composite strands, such as pairs or quads, formed without twisting by positioning the component strands thereof side by side and crossing them in the same plane at predetermined points while they are advanced under tension, and tying them together at the various cross points, by separate loops of twine. Specifically, the strands are drawn in parallel relationship by a capstan through a forming head, which is provided with a pair of spaced flexible tubes at one side thereof. The tubes are intermittently moved transversely of the paths of the strands past each other in order that the strands may be crossed and recrossed alternately on opposite sides of each other. The strands are continually advanced by the capstan so that the crosspoints are moved successively to a stitching head, by which the loops are applied to tie the strands permanently in crossed relationship.

The invention may be better understood by referring to the following detailed description and the accompanying drawing, forming a part thereof, in which Fig. 1 is a diagrammatic plan view of one form of apparatus for carrying out the invention and a pair construction produced thereby, one strand of the pair being indicated as colored, for clarity and convenience;

Fig. 2 is an elevational view corresponding to Fig. 1, and

Fig. 3 is a plan view illustrating the formation, in accordance with the invention, of a quad by combining two pairs similar to that shown in Fig. 1.

Referring to the drawing, wherein similar parts are indicated by identical reference numerals, and initially to Figs. 1 and 2, a composite conducting strand generally designated by the numeral 10 is formed by pairing an insulated conductor 11 with a similar insulated conductor 12. The insulation of conductor 11 is shown colored for clarity and convenience, in order to render it readily distinguishable from the conductor 12, an old expedient which may or may not be followed in practice, as desired. The conductors are drawn from usually separate supply reels (not shown) in the direction indicated by the arrows by means of a driven capstan or take-up reel 14 through a forming apparatus 16. This forming apparatus may consist of a stationary plate 17 having a pair of spaced apertures 19—19 therethrough, the apertures being of sufficient size to permit the free passage through each of either conductor 11 or 12. A flexible tube 21 is secured on the face of the plate nearer to the capstan 14 at one of the apertures 19 for guiding the strand 11, and a similar tube 22 is similarly secured at the other aperture 19 for guiding the strand 12. It will be understood that the material of which the tubes 21 and 22 are composed is sufficiently stiff as to normally maintain the tubes straight and in parallel relationship, as shown in full lines in Fig. 1.

In forming a pair in a manner to be explained below, the free ends of the tubes are intermittently bent toward and beyond each other, in substantially the same plane as originally positioned, a predetermined distance and are held in that position before being released to resume their normal parallel positions. In order to guide an operator and to insure that the tubes are crossed and passed beyond each other the proper distance, they are provided with peripheral bands 24—24 equidistant from the free end of each tube. In order to insure that the tubes may not accidentally be moved too far apart upon being separated to resume their normal parallel position, stationary guards 26 and 27, supported by suitable brackets 28 and 29, respectively, upon the plate 17, are provided.

A vertically reciprocable sewing head 31, forming part of any conventional sewing apparatus (otherwise not shown) and mounted and actuated by the apparatus, is positioned in a plane lying midway between the apertures 19—19 and is provided with a front tooth 32, a rear and larger tooth 33 and a depression 34 between the teeth.

In forming the pair, insulated conductors 11 and 12 are drawn through the plate 17 by the capstan 14 which revolves preferably at a constant speed. As seen in Figs. 1 and 2, strand crosspoints 35, 36, 37, 38, 39 and 40 are indicated, the crosspoints being relatively numbered in the order of their formation. Accordingly, the tubes 21 and 22 are grasped, as by an operator manually, and crossed with each other, in the first instance the tube 22 being passed under the tube 21 with the result that, as at the crosspoint 35, the conductor 11 from the former tube crosses over conductor 12 from the latter tube. The tubes are so held until the crosspoint is drawn to the sewing or stitching head 31, which rises, the tooth 33 first engaging the crosspoint in front thereof and the tooth 32 engaging the crosspoint in the rear thereof, the teeth acting to separate the conductors 11 and 12 on either side of the crosspoint as shown at 40. Simultaneously, a stitch or textile loop 42 is tied around the cross point in place of the teeth, which are then lowered and withdrawn, the conductor remaining connected at the crosspoints by the loop as the pair moves onwardly, and the sewing head momentarily assumes the position shown in dotted lines. The sewing head then rises to assist in tying the next crosspoint. Meanwhile, the capstan 14 continues to draw the conductors through the plate 17. The conductor 11 is caused to recross above the conductor 12 by moving the tubes back to their normal parallel position, thus forming the next crosspoint, as at 36. This crosspoint is then engaged by the sewing head and tied in the manner described above. The capstan continues to draw the conductor through the head and another crosspoint is formed by again crossing the tubes 21 and 22. However, on this occasion, the tube 21 is passed under the tube 22 in order that, as shown at 37, the conductor 11 shall pass under the conductor 12. This is done, among other reasons which will be apparent to those skilled in the art, in order to assist in preventing electrical unbalance between the conductors. The crosspoint 37 is then tied and the conductor advanced, the tubes 21 and 22 being permitted to resume their normal parallel position whereupon the conductors 11 and 12 are recrossed as at 38, the tube 21 passing from under the tube 22. The crosspoint is tied upon engagement of the sewing head, and the conductor advances to form a continuous pair.

The crosspoints 39 and 40 are repetitions of those shown at 35 and 36 and are followed by crosspoints (not shown) formed in the manner as at 37 and 38, from which it will be understood that the portion of the pair between crosspoints 35 and 39 comprises the pitch of the pair, which pitch is maintained throughout the length of the pair. It will be apparent that in order to maintain a predetermined pitch throughout the length of a pair, it is desirable that the pair be advanced and the sewing head reciprocated at constantly proportional speeds and that the crossing and recrossing of the flexible tubes be judiciously effected in order that the distances between adjacent crosspoints throughout the length of the pair shall be constant.

When formed in the manner described above, the pair will be found to possess electrical and physical properties satisfactory to condition it for use in electrical communication systems, and this without twisting the conductors, and to be composed of strands having equal amounts of material per given length of the pair.

As shown in Fig. 3, a quad 44 is formed in the same manner as the pair, save that the components thereof are as pairs 45 and 46 respectively, formed as shown in Fig. 1, rather than a single strand. Accordingly, quad crosspoint 47 is formed in the same manner as crosspoint 35 of the pair and successive quad crosspoints 48, 49, 51 and 52, in the same manner as crosspoints 36, 37, 38 and 39, respectively of the pair, all crosspoints being secured with loops 53, 53 by a reciprocating sewing head, permissibly of the type used in forming the pairs shown in Figs. 1 and 2.

Pairs and quads constructed in the manner described above may be formed at high speeds, the process is economical in operation, and a high grade composite conductor is produced without twisting.

It will be understood that although the invention has been described above in connection with the formation of cable units for transmitting intelligence electrically, it is readily adaptable to the formation of many other types of composite strands; that many details of the foregoing description are not intended as limitations upon applicant's method and that the invention should be limited only by the scope of the appended claims.

What is claimed is:

1. The method of forming a composite insulated conductor quad which consists in crossing and recrossing pairs of insulated conductors at predetermined intervals without twisting, and crossing and recrossing two groups of said crossed and recrossed pairs without twisting.

2. The method of forming an insulated conductor quad which consists in crossing two groups of insulated conductor pairs at predetermined points without twisting, recrossing said groups of conductor pairs at spaced points between the predetermined points without twisting and tying said groups of conductor pairs together at the crosspoints with individual tying means closely encircling each crosspoint.

3. The method of forming an insulated conductor quad which consists in maintaining pairs of insulated conductors in the same plane, crossing them at predetermined intervals, tying them together only at the crosspoints, maintaining two groups of said crossed and tied pairs in the same plane, crossing the groups at predetermined intervals and tying them together only at the crosspoints.

4. The method of handling strands which consists in maintaining a pair of strands in the same plane, crossing them at predetermined points without twisting, and discontinuously tying them together only at the individual crosspoints with tying means closely encircling each crosspoint.

5. The method of handling strands which consists in maintaining a pair of strands in the same plane under tension, crossing them at predetermined points without twisting, and tying them together only at the crosspoints to maintain the crossed relation when the tension is removed.

6. The method of handling strands which consists in advancing a pair of strands, crossing and recrossing one on one side with the other, and crossing and recrossing the one on the other side with the other, the crossing and recrossing taking place without twisting.

7. The method of handling strands which consists in maintaining a pair of strands under tension, crossing and recrossing the one on one side with the other, crossing and recrossing the one on the other side with the other, the crossing and recrossing taking place without twisting and tying them together to maintain the crossed relation when the tension is removed.

8. The method of handling strands which consists in maintaining a pair of strands in the same plane under tension, crossing and recrossing one on one side with the other, crossing and recrossing the one on the other side with the other, the crossing and recrossing taking place without twisting and tying them together only at the crosspoints to maintain the crossed relation when the tension is removed.

9. The method of forming an insulated conductor quad which consists in crossing pairs of insulated conductors at predetermined intervals without twisting, securing them together at the crosspoints, and crossing two of said crossed and secured pairs at predetermined intervals without twisting and securing them together at the crosspoints.

10. In a multi-conductor cable, a pair of composite electrical conductor units, each of said units comprising two insulated strands crossed at predetermined intervals without twisting, and means closely encircling each crosspoint individually for securing said strands at the crosspoints.

11. In a multi-conductor cable, a pair of composite electrical conductor units, each of said units comprising two insulated strands crossed at predetermined intervals without twisting, and non-conducting individual closely encircling means for securing said strands at each of the crosspoints.

12. In a multi-conductor cable, a pair of composite electrical conductor units, each of said units comprising two insulated strands crossed at predetermined intervals without twisting, means for securing said strands at the crosspoints, the individual units comprising said pair of composite units crossed at predetermined intervals without twisting, and means for securing said units at the crosspoints.

13. In a multi-conductor cable, a pair of composite electrical conductor units, each of said units comprising two insulated strands and having one of said strands alternately crossed and recrossed on one side of the other strand and crossed and recrossed on the other side of said other strand without twisting.

14. In a multi-conductor cable, a pair of composite electrical conductor units, each of said units comprising two insulated strands and having one of said strands alternately crossed and recrossed on one side of the other strand and crossed and recrossed on the other side of said other strand, one of said units comprising said pair of composite units alternately crossed and recrossed on one side of the other of said units and crossed and recrossed on the other side of said other unit without twisting.

15. In a multi-conductor cable, a pair of composite electrical conductor units, each of said units comprising two insulated strands crossed at predetermined intervals without twisting, and a plurality of individual means closely encircling each crosspoint for tying the pair of composite conductor units together at the individual crosspoints.

16. In a multi-conductor cable, a pair of composite electrical conductor units crossed at predetermined intervals without twisting, and individual tying means closely encircling each crosspoint for securing said units at the crosspoints.

17. The method of handling strands which consists in maintaining a pair of strands in the same plane, crossing them without twisting, and applying a tying member encircling each of the crosspoints of the strands lengthwise of the pair of strands and between the same.

18. In a multi-conductor cable, a pair of electrical conductor strands crossed and recrossed without twisting, in combination with tying means closely encircling each crosspoint lengthwise of the pair of conductor strands.

ROLAND R. NYDEGGER